United States Patent
Spearing

(10) Patent No.: US 6,839,942 B1
(45) Date of Patent: Jan. 11, 2005

(54) ADJUSTABLE SECUREMENT DEVICE AND ITS METHOD OF USE

(76) Inventor: Daniel R. Spearing, 7825 Benton St., SE., Huntsville, AL (US) 35802

(*) Notice: Subject to any disclaimer, the term of this patent is extended or adjusted under 35 U.S.C. 154(b) by 0 days.

(21) Appl. No.: 10/298,333

(22) Filed: Nov. 18, 2002

(51) Int. Cl.⁷ .......................... A44B 17/00; F18G 11/00; A62B 35/00
(52) U.S. Cl. .................. 24/115 R; 24/115 M; 24/22.6; 24/129 R; 24/130; 248/328
(58) Field of Search .......................... 24/115 R, 115 M, 24/129 R, 130, 122.6; 248/328

(56) References Cited

U.S. PATENT DOCUMENTS

| | | | |
|---|---|---|---|
| 1,044,302 A | * 11/1912 | Underhill | 24/115 R |
| 1,389,859 A | * 9/1921 | Chronister | 24/115 M |
| 2,637,591 A | * 5/1953 | Maxfield et al. | 24/115 R |
| 3,119,160 A | * 1/1964 | Hoppeler | 24/115 R |
| 3,540,637 A | * 11/1970 | Ezell et al. | 24/115 R |
| 3,888,448 A | * 6/1975 | Rowland | 24/129 R |
| 4,220,306 A | 9/1980 | Cueto et al. | |
| 4,667,772 A | * 5/1987 | Kammerer | 24/115 M |
| 5,020,192 A | 6/1991 | Gerlach | |
| 5,233,716 A | 8/1993 | Hicks | |
| 5,339,498 A | 8/1994 | Parsons | |
| 5,791,022 A | * 8/1998 | Bohman | 24/129 R |

* cited by examiner

Primary Examiner—Victor Sakran
(74) Attorney, Agent, or Firm—Lanier Ford Shaver & Payne P.C.

(57) ABSTRACT

An adjustable securement device is provided comprising a rod having a plurality of openings therein. Such rod has at least a first and a second opening therein at opposed ends thereof wherein such openings are generally parallel. A centrally located through-slot is provided for the passage of a securement ring. Such ring may easily traverse the length of the slot and at one end may be affixed to ensure the affixation of the securement device at a designated position along a supporting line. Finally, a groove is provided at one end of the rod to aid in securing an end of the support line to the rod.

19 Claims, 6 Drawing Sheets

ADJUSTABLE SECUREMENT DEVICE AND ITS METHOD OF USE

BACKGROUND OF THE INVENTION

This invention generally relates to an adjustable securement device. In particular, the present invention relates to a device for securing an object to a fixed point. More particularly, the present invention relates to a single piece adjustable securement device.

Traditionally, ropes securing two objects or an object to a fixed point have been formed using a variety of sophisticated knots. It was, at one time, necessary for a person participating in various activities to have an extensive knowledge and skill in tying knots suitable for particular purposes. The time required to gain the knowledge and learn skills in tying such knots were often both nonproductive and potentially dangerous.

As a result, various easy-to-use devices have been created to operate as securement devices. Such devices generally fall into two broad categories, guy supports and general purpose tie downs. Guy supports are used to connect an object to a reference point or to connect two points to be secured together. Generally, such supports are used in coordination with a turnbuckle that allows for adjustment of the device so as to position the secured points a certain distance apart. Such supports are maintained in tension at all times to provide support for the objects being maintained in a predefined position.

General-purpose tie downs, by contrast, are used as utility supports in a wide variety of applications. Such tie downs are tightened by hand and offer the capability to quickly adjust the distance between the secured object and a reference point. As a result, such general-purpose tie downs are more often used by hobbyists and participants in such activities as boating, camping, games playing (i.e., to aid in supporting tennis, badminton and/or volleyball nets), and horticulture or to secure antennas, loads on trailers or temporarily affix an object to a predefined location.

The devices of both categories have suffered from various limiting aspects. For instance, guy supports typically require tools for their use in securing two fixed reference points. They are often incorporated in a support system already exhibiting an extreme amount of tension that prohibits positioning or tightening the support by hand. In the case of some guy supports, a turnbuckle must be used to aid the installer in adjusting the tension along the support Further, when determining the length of the support, no system available is capable of providing an adjusted support less than half the length of the original support.

General tie downs have similarly suffered their share of limitations. Often such devices are incapable of locking in place without the use of knots. Further, should one of the objects or reference points being secured move, the lack of tension in the support line often results in the tie-down coming loose or even failing. It is, therefore, desirable to provide a single piece adjustable securement device in accordance with the present invention that is capable of locking the securement means to the support line while allowing for ease of adjustment. Further, it is desirable to provide such an adjustable securement device that will allow for the formation of a loop within the support line for securing objects together as well as securing such objects to a fixed reference point. Additionally, when determining the length of the support, no system available is capable of providing an adjusted support less than half the length of the original support.

SUMMARY OF THE INVENTION

The present invention recognizes and addresses various of the foregoing limitations and drawbacks, and others, concerning securement devices, including general-purpose tie downs. Therefore, the present invention is directed to single piece adjustable securement devices.

It is therefore, a principle object of the subject invention to provide a securement device. More particularly, it is an object of the present invention to provide an adjustable securement device. In such context, it is still a more particular object of the present invention to provide a single piece securement device.

Still further, it is a principle object of this invention to provide a securement device easily operated by hand. It is a further object of the present invention to provide an adjustable securement device that is easy and costefficient to manufacture. In such context, it is an object of the present invention to provide a single piece adjustable securement device.

It is still further object of the present invention to provide an adjustable securement device capable of allowing the formation of a loop in one end of the support line to which it is affixed to allow for the securement of multiple objects to each other rather than to a fixed reference point. In such context, it is another object of the present invention to provide such a device capable of securing the device to the support line when such line becomes slack.

Additional objects and advantages of the invention are set forth in, or will be apparent to those of ordinary skill in the art from, the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivilants (including combinations of features or configurations thereof not expressly shown in the figures or stated in the detailed description).

These and other features, aspects and advantages of the present invention will become better understood with reference to the following descriptions and appended claims. The accompanying drawings, which are incorporated in and constitute a part of this specification, illustrate an embodiment of the invention and, together with the descriptions, serve to explain the principles of the invention.

In a first exemplary embodiment, there may be provided an adjustable securement device comprising an extended rod having a plurality of openings therein. A first of such openings may be drilled therethrough near one end of such rod. The second of such openings may be drilled at the opposing end of such rod and passes through such rod in a direction parallel to that of the first opening.

A curvilinear slot may be centrally located within the rod with such slot being disposed at an angle to the first and second openings therein. Alternatively, a pair of laterally opposed longitudinal grooves may be formed along said rod. Within such slot (or said pair of longitudinal grooves) may be located a securement ring capable of traversing the length of the slot (or the pair of longitudinal grooves) and becoming secured at one end thereof thus allowing the support line and the present invention to maintain a desirable relationship. Finally, a groove may be formed at the end of rod proximal to the second opening. Such groove may be formed in such rod between the second opening and the end of the rod. The securement line may be looped through such second opening and then secured to the proximal end of the rod by looping said support line around the rod in such groove.

In a second alternative embodiment of the present invention, there may be provided an adjustable securement device comprising a rod having a plurality of openings therein. A first of such openings may be drilled therethrough near one end of such rod. The second of such openings may be drilled at the opposing end of such rod and may pass through such rod in a direction parallel to that of the first opening.

A securement ring may be located about the rod. A support line may pass through both the first of such openings and said securement ring. Such securement ring may traverse the length of such rod and become secured at one end thereof so as maintain the present invention and the support line in a desirable relationship. Finally, a groove may be formed at the end of the rod proximal to the second opening. Such groove may be formed in such rod between the second opening and the end of the rod. The securement line may be looped through such second opening and then secured to the proximal end of the rod by looping said support line around the rod in such groove.

In a third alternative embodiment of the present invention, an adjustable securement device may be provided identical to the above described second alternative embodiment. Additionally, such rod may further comprise a second groove formed therein on a side of such rod opposite that of said first groove. Such second groove may be formed nearer said second end of such rod on an opposite side of said second opening from said first groove. Such second groove may serve to aid in supporting said securement ring in a fixed position so as to maintain the present invention and said support line in a desirable relationship.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
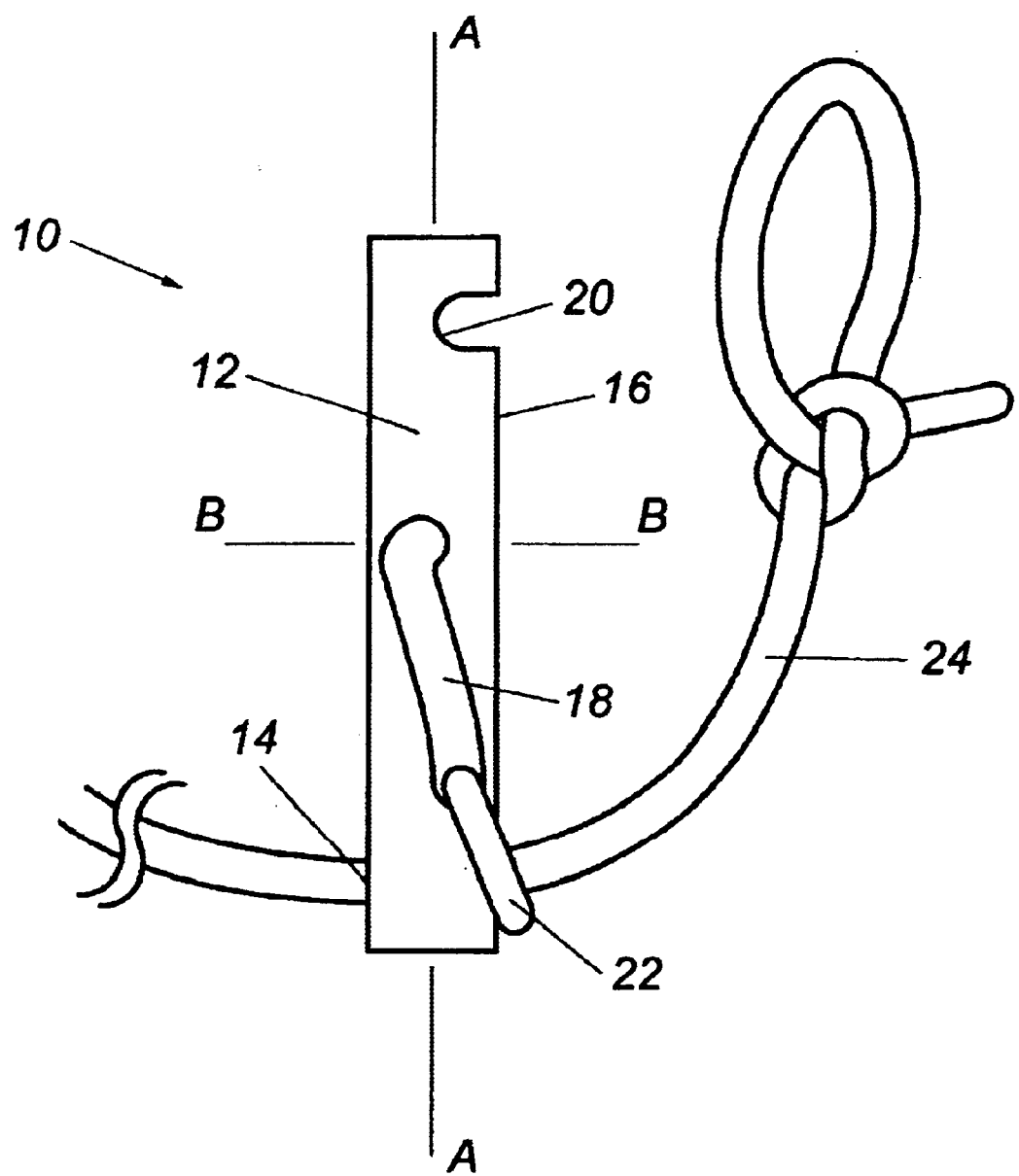
FIG. 1 is side view of an exemplary adjustable securement device in accordance with the present invention depicting a support line passing through a hole at the base of the device.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to presently preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment Still further, variations in selection of materials and/or characteristics may be practiced, to satisfy particular desired user criteria. Thus, it is intended that the present invention cover such modifications and variations as come within the scope of the present features and their equivalents.

Figure 2:
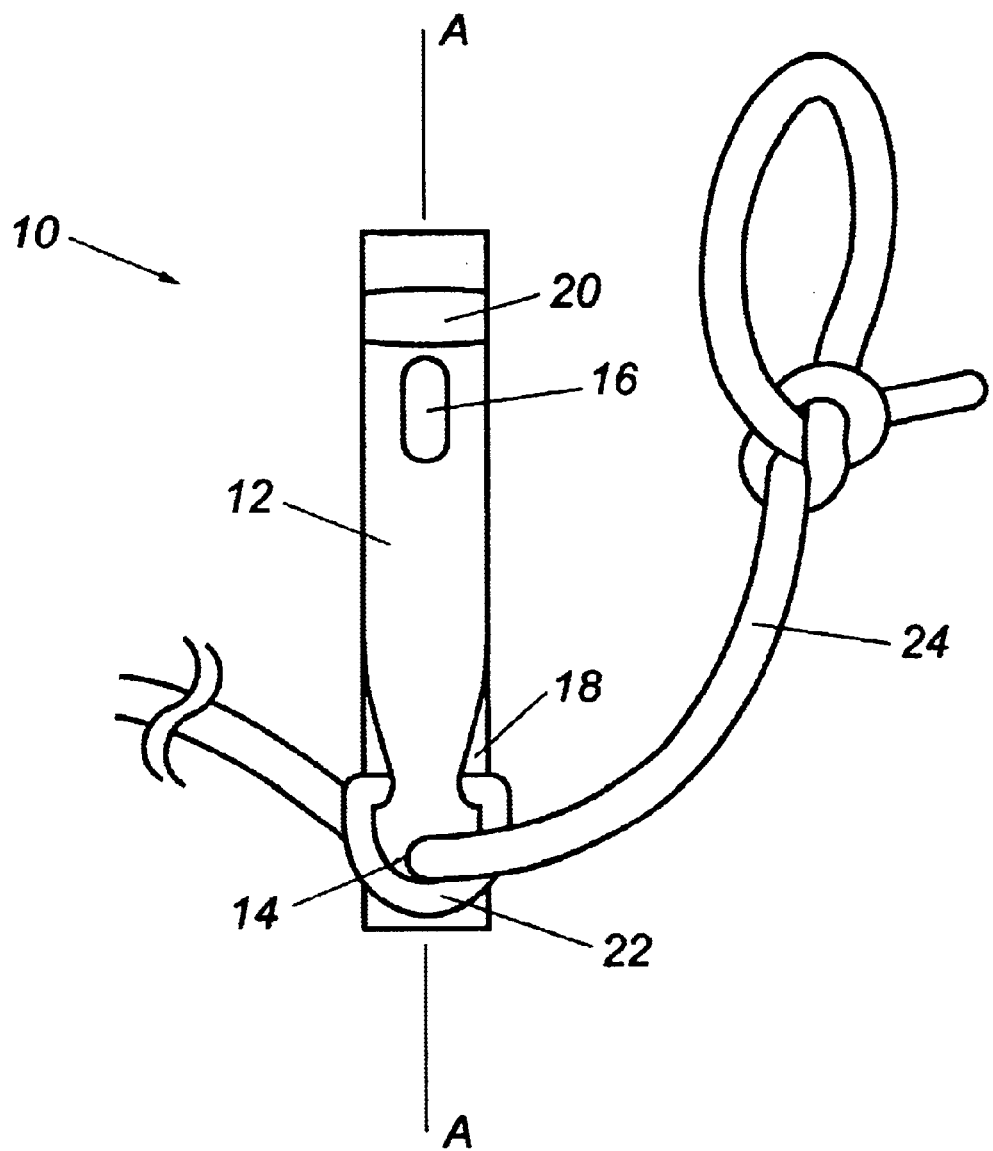
FIG. 2 is a front view of the exemplary embodiment of the present invention as depicted in FIG. 1, wherein such support line is also passed through a ring located in a slot within the device.

As disclosed above, the present invention is particularly concerned with an adjustable securement device capable of securing two or more objects together and/or securing an object or plurality of objects to a fixed reference point. FIGS. 1 and 2 depict a preferred embodiment of the present invention including an exemplary adjustable securement device 10 including a rod 12 with a plurality of openings 14 and 16, a curvilinear slot 18 and a groove 20 therein.

The rod 12 defines a longitudinal axis A—A along its length.

Further shown is a lateral axis B—B. A first of the plurality of openings 14 may be located at a first end of the rod 12. Such opening 14 is generally parallel to such lateral axis B—B. The second of such plurality of openings 16, similarly parallel to said lateral axis B—B, may be located near a distal end of such rod 12.

Such curvilinear slot 18 lies generally along the longitudinal axis A—A while its passage through such rod 12 is generally perpendicular to both the longitudinal and lateral axes A—A and B—B. Positioned for manual passage therein, a securement ring 22 may be provided. Such ring 22 may be used to aid in securing the device to a support line 24 used to either secure a plurality of objects together or to secure one or more objects to a fixed reference point. Finally, the groove 20 runs generally parallel to such slot 18.

Such rod 12 may comprise any material, including but not limited to wood, aluminum, steel or a hard plastic and be of any shape, including but not limited to cylindrical, triangular, rectangular or elliptical, provided it is sufficiently resilient to both the shear and torque loading generated by the tension of the support line. Similarly, the generally curvilinear slot 18 may be of any shape, including but not limited to an "r", "s" or "t"-shape, provided such slot 18 includes a laterally disposed segment to aid in supporting the securement ring 22 in a locked position when located at or near the distal end of the rod 12 (nearer the second opening 16). Finally, securement ring 22 may be of any shape sufficient to ensure ease of movement through such slot 18, while both being capable of fitting within said laterally disposed segment of slot 18 in a lock position and provided such shape serves to prevent unnecessary wear on support line 24.

As shown in FIGS. 1 and 2, the general mode of operation of the device 10 involves a proximal end of the support line 24 being past through the first opening 14 at a first end of the rod 12. Simultaneously, such support line 24 may pass through the securement ring 22, which is positioned at an end of the slot 18 nearest the first opening 14. The proximal end of the support line 24 is then looped and secured in any manner sufficient to secure the rope on itself, including but not limited to either a simple knot or a rope clamp.

Figure 3:
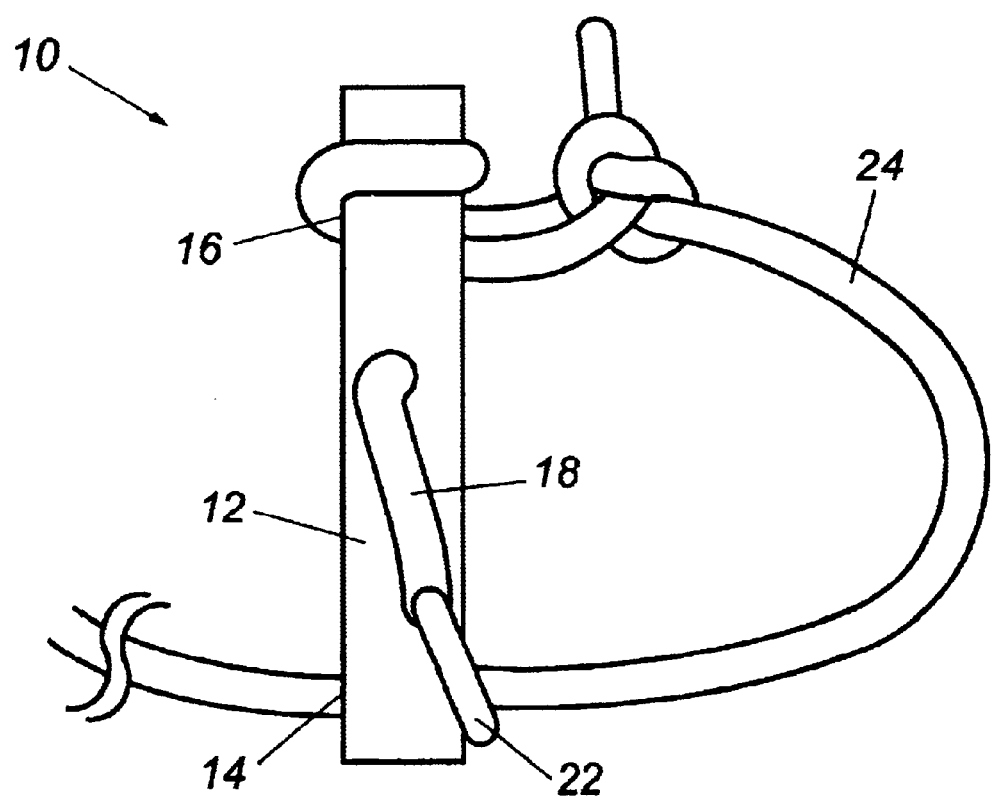
FIG. 3 is a side view of the exemplary embodiment of the present invention as depicted in FIG. 1, wherein the looped free-end of the support line has been secured to the upper end of the device.
Figure 4:
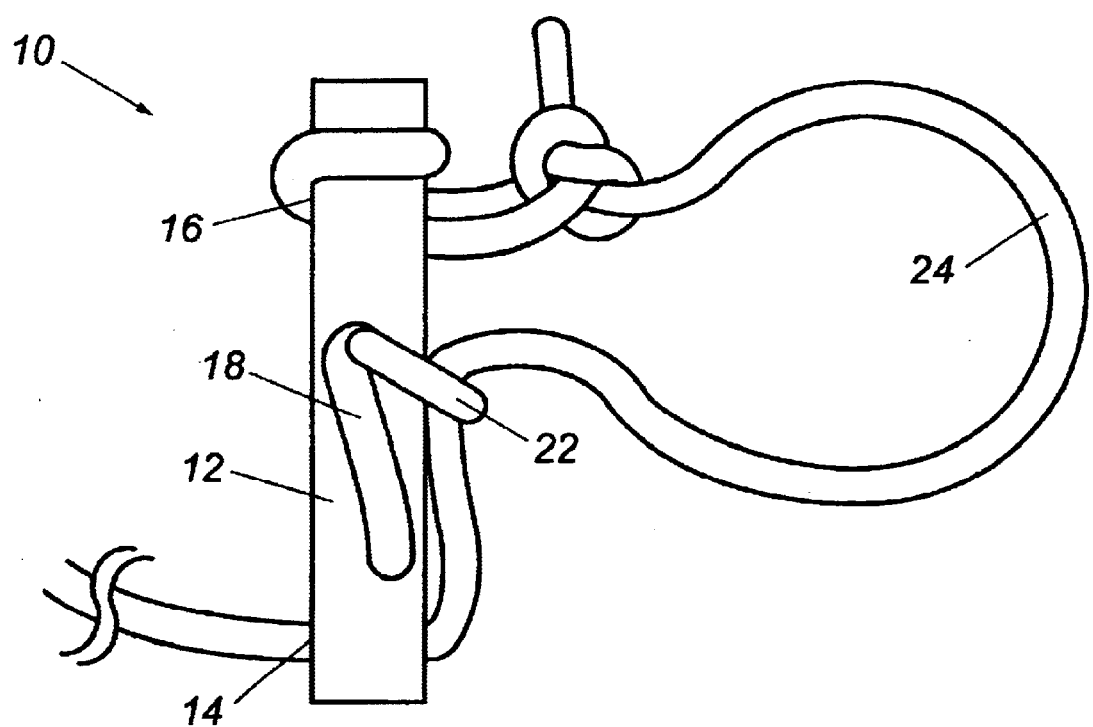
FIG. 4 is a side view of the exemplary embodiment of the present invention as depicted in FIG. 1, wherein the support line has been secured to a fixed length by the movement of a ring into the secured position via the slot within the device body.

Such loop may then be passed through the second opening 16 which may be elongated to allow for the passage of a double width of the support line and fastened to the distal end of the device 10 by placing the loop around the rod 12 inside the groove 20 as depicted in FIGS. 3 and 4. The securement ring 22 floats freely within the slot 18 to allow the device to lock the support line 24 in relation to the device 10. In the unlocked position, wherein the securement ring 22 is located at a first end of said rod 12, the support line 24 may move freely within the first hole thus allowing the support line's length to be easily adjusted.

Where the user desires to adjust the length of the support line 24 whose ends are affixed to opposed objects, the maintenance of the rod 12 at a generally perpendicular angle to the support line 24 allows for the positioning of the device 10 at the desired location along the support line 24. When such position is reached, rotating the device 10 to a position more parallel to the support line 24 prohibits movement of the device 10 relative to ale support line 24. Locking the securement ring 22 in said laterally disposed section of slot 18 further assures the affixation of the device 10 at the desired position along the support line 24.

To lock the device 10, the securement ring 22 is positioned in the laterally disposed section of slot 18 located nearer the rod's distal end. In such locked position, the support line 24 and the rod 12 maintain an angular relationship that ensures any additional tension will result in the support line 24 becoming fixed between the securement ring 22 and the rod 12. Additionally, such fixed position of the support line 24 allows for the creation of a secure loop in the support line 24 between the securement ring 22 and the second opening 16. Such loop may be used in conjunction with removable clips or hooks to securely join a plurality of objects to each other. Further, such secure loop may be sized to allow for securing a plurality of objects together as a unit.

Figure 5:
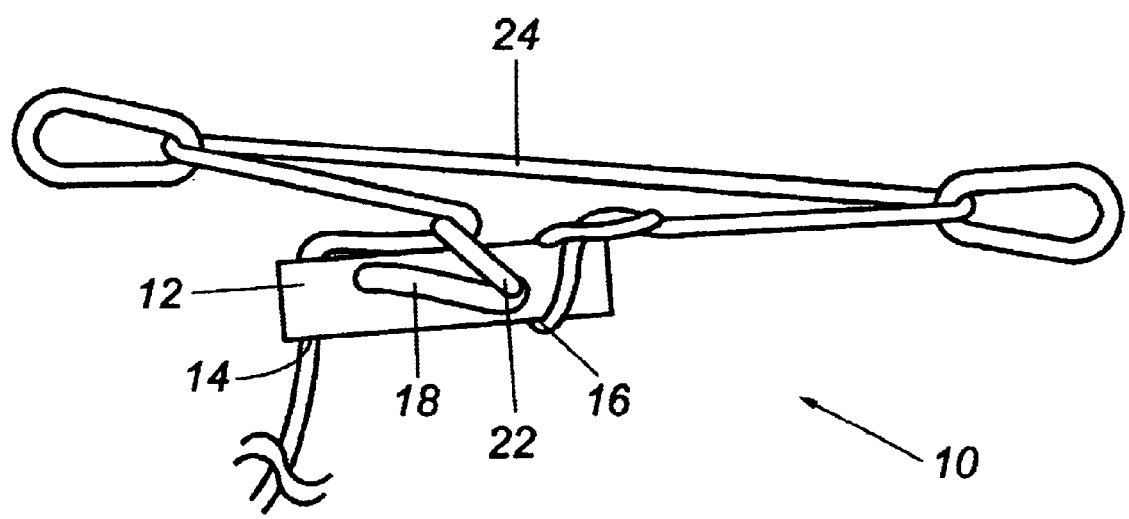
FIG. 5 is a side view of the exemplary embodiment of the present invention as depicted in FIG. 1, wherein the device has been configured to generate a secured loop and a tie-down length less than half the length of the support line.
Figure 6:
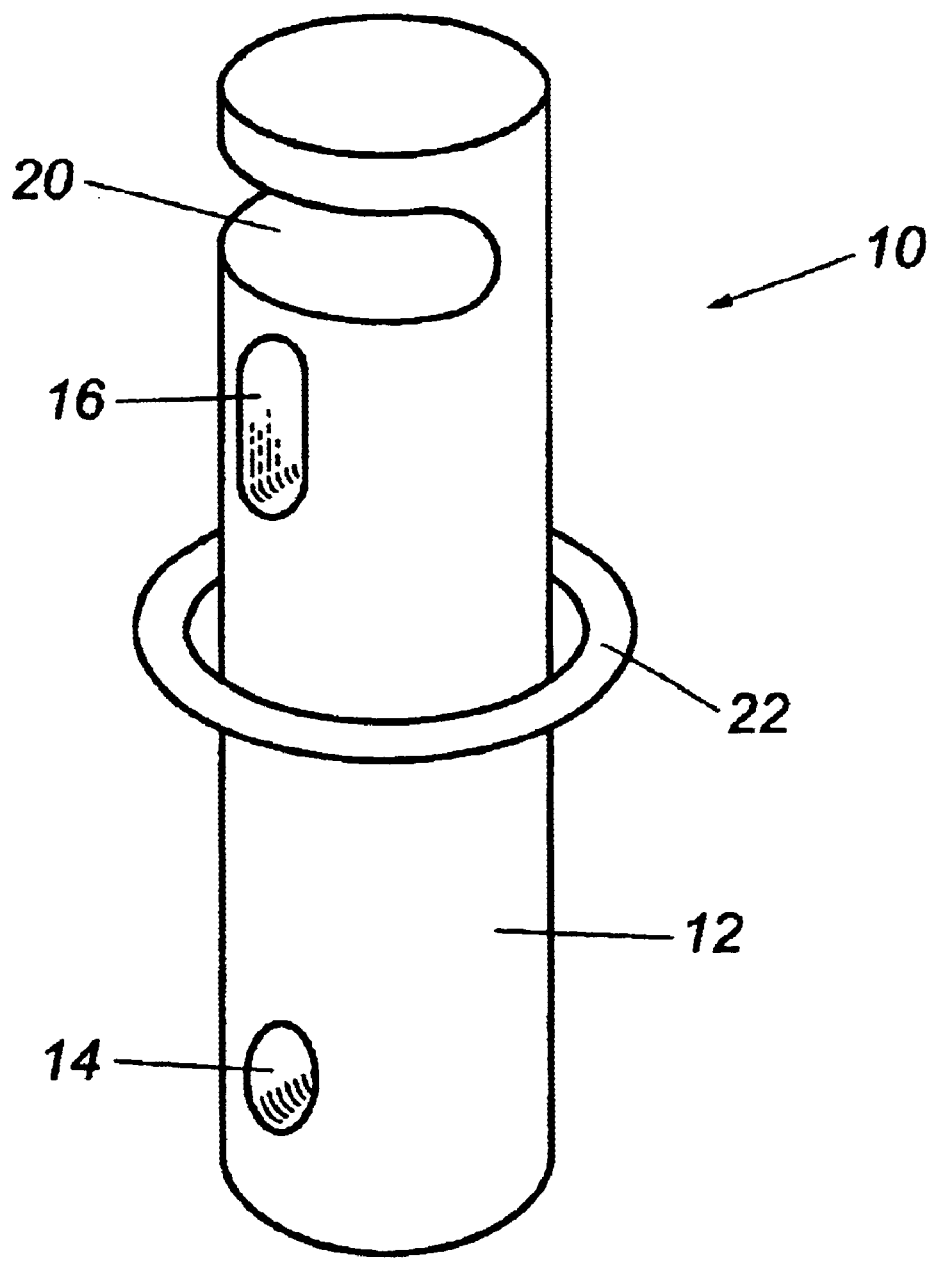
FIG. 6 is a perspective view of an alternative embodiment of the present invention.

Finally, as depicted in FIG. 5, the device 10 may be used to generate a tie-down of any length by affixing attachment means, including but not limited to, hooks or clips. Typically, such a tie-down device may only reduce the length of the support line 24 by half. By using the present invention to create a secured loop and intentionally sizing such loop to approximately twice the desired length of the tie-down, a user may afix two or more attachment means to the secured loop and thus obtain a tie-down of any desired length despite the length of support line 24.

Although a preferred embodiment of the invention has been described using specific terms and devices, such description is for illustrative purposes only. The words used are words of description rather than of limitation. It is to be understood that changes and variations may be made by those of ordinary skill in the art without departing from the spirit or the slope of the present invention, which is set forth in the following claims. In addition, it should be understood that aspects of various other embodiments may be interchanged either in whole or in part. Therefore, the spirit and scope of the appended claims should not be limited to the description of the preferred version contained herein.

What is claimed is:

1. An adjustable securement device, comprising:
   a supporting line;
   a rod having a plurality of openings therein, wherein said openings share parallel longitudinal axes and are generally located at opposing ends of said rod;
   a centrally located slot running generally perpendicular to said longitudinal axes of said openings;
   a securement ring located within said slot; and
   a groove located at one end of said rod for securement of an end of said supporting line thereto.

2. An adjustable securement device as specified in claim 1, wherein said plurality of openings comprise two parallel opening ends of said rod.

3. An adjustable securement device as specified in claim 2, wherein one of said two parallel openings is elongated.

4. An adjustable securement device as specified in claim 1, wherein said shot further comprised a laterally disposed segment capable of suppporting said securement ring in a fixed position at one end thereof.

5. An adjustable securement device as specified in claim 1, wherein said slot comprises a pair of laterally opposed longitudinal grooves each with a laterally disposed segment capable of supporting said securement ring in a fixed position at one end thereof.

6. An adjustable securement device as specified in claim 5, wherein said securement ring traverses the length of said grooves without fully penetrating said rod.

7. An adjustable securement device as specified in claim 1, wherein said slot is generally "r"-shaped.

8. An adjustable securement device as specified in claim 1, wherein said securement ring is a "D"-ring.

9. An adjustable securement device, comprising:
   a supporting line;
   a rod having a plurality of openings therein, said plurality of openings including a first opening at a first end of said rod and a second elongated opening at a distance end of said rod;
   a securement ring located about said rod, wherein said securement ring is free to traverse the entire length of said rod;
   wherein said support line passes through said first opening in a first direction, between said rod and said securement ring, through said second elongated opening in a second opposite direction, and is secured to said distal end of said rod; and
   wherein said securement ring is used to frictionally maintain said support line in a fixed relationship with said rod then said support line is under tension.

10. An adjustable securement device as specified in claim 9, wherein said rod has a lateral groove located near its distal end for said plurality of openings capable of supporting said securement ring in a fixed position while said support line is under tension so as to maintain said rod and said support line in a desirable relationship.

11. An adjustable securement device as specified in claim 9, wherein said support line secures two or more objects together.

12. An adjustable securement device as specified in claim 9, wherein said support line secures an object or plurality of objects to a fixed reference point through the formation of a tie down of any length.

13. An adjustable securement device, comprising:
a rod having a plurality of openings therein, wherein said openings share parallel longitudinal axes and are generally located at opposing ends of said rod;
a securement means attached to said rod; and
a groove located at one end of said rod; and
wherein said support line passes through a first of said plurality of openings in a first direction, then between said rod and said securement means, then through a second of said plurality of openings in a second opposite direction from said first direction, and is secured about said rod in said groove.

14. An adjustable securement device as specified in claim 13, wherein said plurality of openings comprise two parallel openings at opposing ends of said rod.

15. An adjustable device as specified in claim 13, further comprising a support line for use in maintaining a desired distance relationship between a plurality of objects or between an object and a fixed point while said support line is under tension.

16. An adjustable securement device as specified in claim 15, wherein said securement means frictionally maintains said support line in a desired and fixed relationship with said rod.

17. An adjustable securement device as specified in claim 16, wherein said device may be used to form a tie down of any length.

18. An adjustable securement device as specified in claim 16, wherein said securement means is a generally round ring passing through said rod.

19. An adjustable securement device as specified in claim 16, wherein said securement means is a generally round ring located about said rod.

* * * * *